D. DAVIS.

Improvement in Hubs for Vehicle-Wheels.

No. 128,600.          Patented July 2, 1872.

Witnesses:

Daniel Davis 128,600

UNITED STATES PATENT OFFICE.

DANIEL DAVIS, OF NEW YORK, N. Y.

IMPROVEMENT IN HUBS FOR VEHICLE WHEELS.

Specification forming part of Letters Patent No. 128,600, dated July 2, 1872.

Specification describing a new and Improved Wheel-Hub, invented by DANIEL DAVIS, of the city, county, and State of New York.

The objects of this invention are the more effectual securing of the spokes in a wooden hub, and, at the same time, the protection of the exterior portion or face of such hub, and also to obtain a strong and durable hub at a less expense than the metallic hubs now being introduced. To these ends the invention consists in the combination of a novel construction of the wooden hub with a shoulder, a novel arrangement of mortises in relation with said shoulder, and a metallic shell of novel construction covering the exterior portion or face of the hub, and bearing against the spokes and clamping them between it and the shoulder on the wooden portion of the hub, by means of screw-bolts inserted at the back of the hub and passing through and between the spokes.

Figure 1:
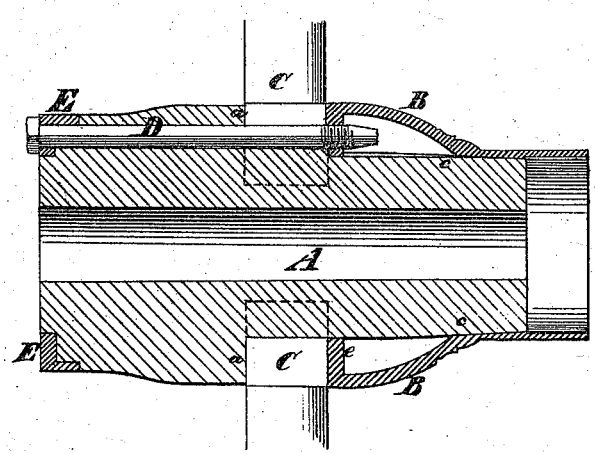
Figure 2:
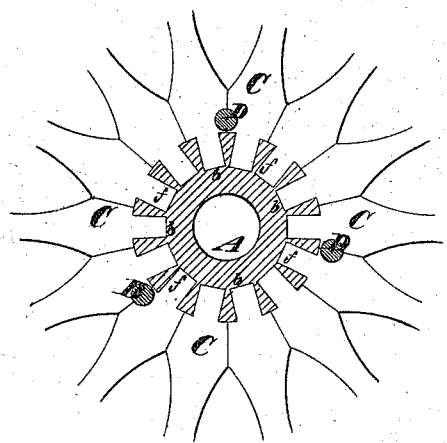
Figure 3:
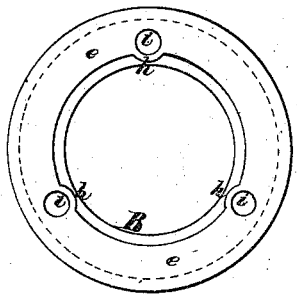

In the accompanying drawing Figure 1 is a central longitudinal section of a hub constructed according to my invention. Fig. 2 is a transverse section of the same taken at the outer face of the spokes; and Fig. 3 is an end view of the shell of the hub. Similar letters of reference indicate corresponding parts in all the figures.

A is the wooden portion or body of the hub, which is bored to receive an ordinary axle-box, and has, at a suitable distance from its inner end, its external circumference reduced to its outer end, thereby forming a shoulder, $a$. The smaller portion $c$, in front, is thus tapered slightly toward the front of the hub. Immediately in front of the shoulder $a$ in the periphery of the smaller portion $c$ of the hub, a series of mortises, $b\ b$, are radially formed for the reception of the spokes C C. The spokes have formed on their ends tenons $f\ f$ to fit the mortises $b\ b$ in the hub, and beyond these tenons are so formed as to fit snugly together, their meeting faces being radial to the center of the hub and combining to form arches $g\ g$ between the spokes, whereby great strength and rigidity are given them. B is the metal shell which fits over the smaller portion $c$ of the hub. Its rear portion is of an external diameter, corresponding with that of the shoulder $a$ of the rear wooden portion of the hub, and is provided with an inwardly-projecting flange, $e$, whose inner periphery is of a size to fit snugly around the smaller wooden portion $c$ of the hub, and has formed on it at intervals lugs $h\ h$ which fit in shallow grooves in the contiguous portion of said hub, and opposite which there are formed in the flange tapped holes $i\ i$ for the reception of the ends of screw-bolts D D. The front portion of the shell B is internally tapered to fit the taper of the portion $c$ of the hub, and it projects some distance beyond the end of the latter, and forms a fender for the nut which secures the wheel on its axle. The bolts D D are inserted at the back of the hub, and pass through it to the spokes and between the latter, and screw into the tapped holes $i\ i$ in the flange $e$ of the shell B. At the back exterior edge of the hub there is a rabbeted band, E, which, in addition to preventing the hub from splitting, forms a bearing for the heads of the bolts D D.

When the parts are put together the bolts D D are screwed up, and by drawing the shell B against the spokes they are tightly clamped against the shoulder $a$ of the hub, and so held rigidly in place. Should the spokes become loose by shrinkage or otherwise the bolts can be screwed up to tighten up the shell and clamp the spokes firmly between it and the shoulder $a$. By means of the shell B that portion of the hub most liable to wear or to be damaged is protected, and the hub thereby made equal in strength and durability to an iron hub, at much less expense.

I do not claim, broadly, a hub in which the spokes are clamped between its front and rear portions, as many such have been made of all metal; but

What I claim and desire to secure by Letters Patent, is—

A hub the body A of which is made of wood, in combination with the metal shield B, on its outer portion the rabbeted collar E at its inner end, and the clamping-bolts D, all arranged as shown and described.

DANIEL DAVIS.

Witnesses:
 FRED HAYNES,
 R. E. RABEAU.